US010935365B2

(12) United States Patent
Heidemann et al.

(10) Patent No.: US 10,935,365 B2
(45) Date of Patent: Mar. 2, 2021

(54) MOUNTING ARRANGEMENT FOR 3D SENSOR

(71) Applicant: FARO Technologies, Inc., Lake Mary, FL (US)

(72) Inventors: Rolf Heidemann, Stuttgart (DE); Axel Ruhland, Stuttgart (DE); Christoph Neundorf, Langewiesen (DE); Steffen Kappes, Oedheim-Degmarn (DE); Markus Grau, Marbach (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 35 days.

(21) Appl. No.: 16/381,238

(22) Filed: Apr. 11, 2019

(65) Prior Publication Data
US 2019/0323822 A1    Oct. 24, 2019

Related U.S. Application Data

(60) Provisional application No. 62/659,313, filed on Apr. 18, 2018.

(51) Int. Cl.
  *C01B 11/00* (2006.01)
  *G01B 11/00* (2006.01)
  *G01B 11/25* (2006.01)
(52) U.S. Cl.
  CPC ............ *G01B 11/002* (2013.01); *G01B 11/25* (2013.01)

(58) Field of Classification Search
  CPC ... G01B 11/002; G01B 11/25; G01B 11/5755; G01B 11/2545; G01B 2210/286; B25B 5/06
  USPC .................................................. 356/610–624
  See application file for complete search history.

(56) References Cited

U.S. PATENT DOCUMENTS

| | | | | |
|---|---|---|---|---|
| 4,781,517 A | * | 11/1988 | Pearce | B23P 19/04 104/167 |
| 6,141,105 A | * | 10/2000 | Yahashi | G01B 11/005 356/623 |
| 9,156,510 B2 | * | 10/2015 | Petit | B62D 65/026 |
| 10,002,431 B2 | * | 6/2018 | Sridhar | G06K 9/28 |
| 2010/0309483 A1 | * | 12/2010 | Crowther | G01B 11/2755 356/606 |

* cited by examiner

*Primary Examiner* — Isiaka O Akanbi
(74) *Attorney, Agent, or Firm* — Cantor Colburn LLP

(57) ABSTRACT

A 3D sensor system with a mounting arrangement is provided. The system includes a 3D sensor that measures 3D coordinates of a surface, the 3D sensor having a body with a slot disposed in a side, the slot further having a recess centrally disposed thereon. One or more slot nuts are disposed in the slot. A mounting bracket is provided having a pair of keystone members and a dowel pin disposed therebetween, the keystone members being disposed in the slot and the dowel pin being disposed in the recess, the mounting bracket having a plurality of holes aligned with the slot. One or more fasteners are provided that extend through the plurality holes and engage the one or more slot nuts to couple the mounting bracket to the 3D sensor.

17 Claims, 5 Drawing Sheets

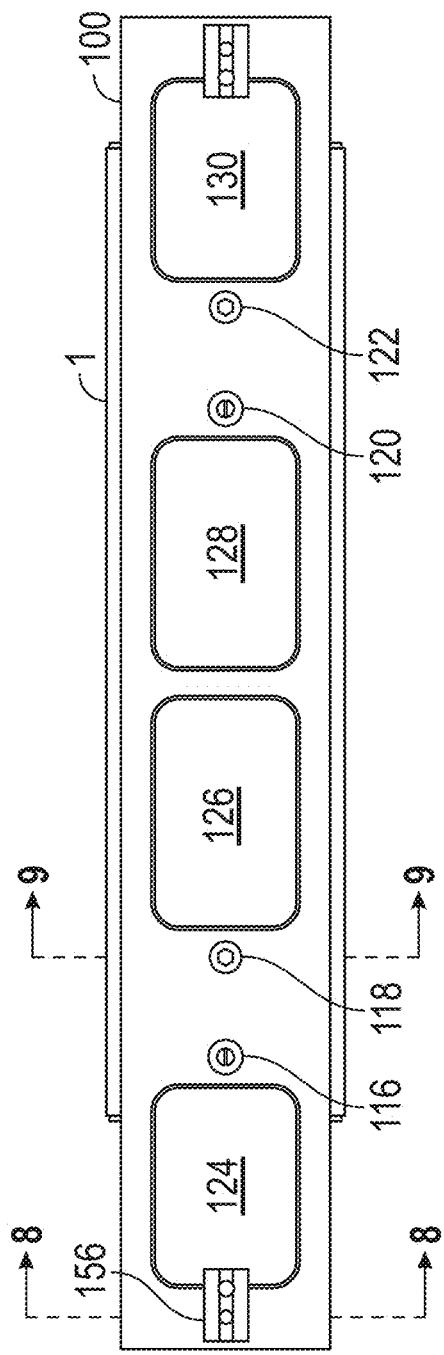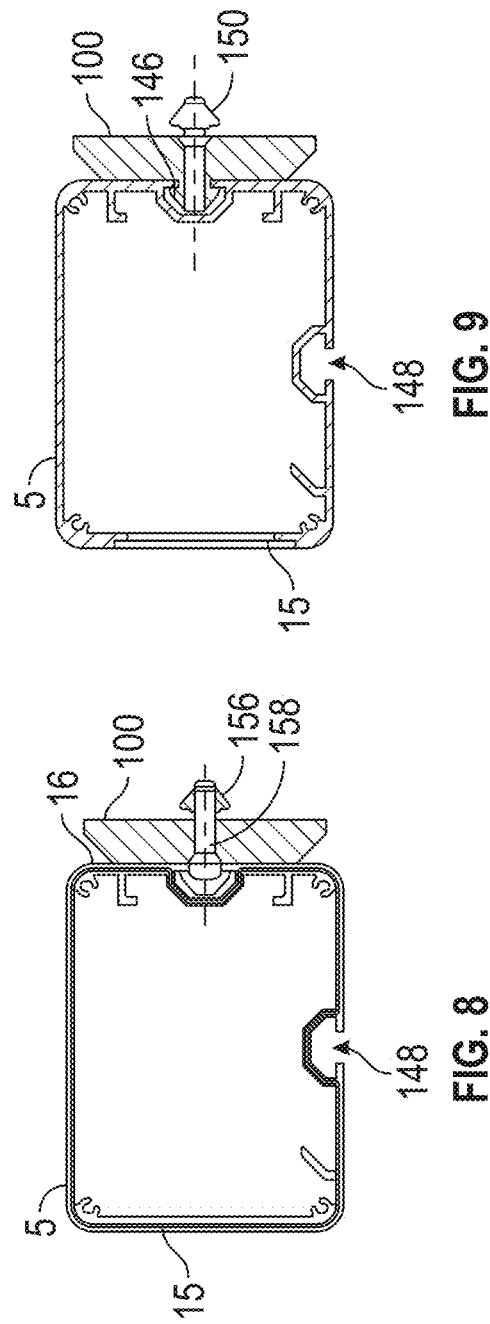

MOUNTING ARRANGEMENT FOR 3D SENSOR

CROSS-REFERENCE TO RELATED APPLICATIONS

The present application is a nonprovisional application of U.S. Provisional Application 62/659,313 entitled "Mounting Arrangement for 3D Sensor" filed on Apr. 18, 2018, the contents of which are incorporated by reference herein.

BACKGROUND

The subject matter disclosed herein relates to a three-dimensional (3D) sensor for scanning an object or the environment and measuring 3D coordinates.

3D sensors are used in many environments to measure 3D coordinates of an object. In some cases, these 3D sensors are fastened to a support member that holds the 3D sensor during operation. The fastening of the 3D sensors in many cases requires custom mounting hardware and does not allow for the sensor to be repeatedly mounted without calibration.

Accordingly, while existing 3D sensors are suitable for their intended purpose the need for improvement remains, particularly in providing a flexible mounting arrangement that allows 3D sensors to be quickly and repeatedly installed.

BRIEF DESCRIPTION

According to one aspect of the invention, a 3D sensor system is provided. The system includes a 3D sensor that measures 3D coordinates of a surface, the 3D sensor having a body with a slot disposed in a side, the slot further having a recess centrally disposed thereon. One or more slot nuts are disposed in the slot. A mounting bracket is provided having a pair of keystone members and a dowel pin disposed therebetween, the keystone members being disposed in the slot and the dowel pin being disposed in the recess, the mounting bracket having a plurality of holes aligned with the slot. One or more fasteners are provided that extend through the plurality holes and engage the one or more slot nuts to couple the mounting bracket to the 3D sensor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 is a side view of the mounting bracket coupled to the 3D sensor of FIG. 4;

FIG. 8 is an end sectional view along the line A-A of the sensor housing and mounting bracket assembly of FIG. 7;

FIG. 9 is an end sectional view along the line B-B of the sensor housing and mounting bracket assembly of FIG. 7;

The detailed description explains embodiments of the invention, together with advantages and features, by way of example with reference to the drawings.

DETAILED DESCRIPTION

Embodiments of the present invention provide advantages providing a flexible mounting arrangement for coupling 3D sensors to structures and fixtures.

Figure 4:
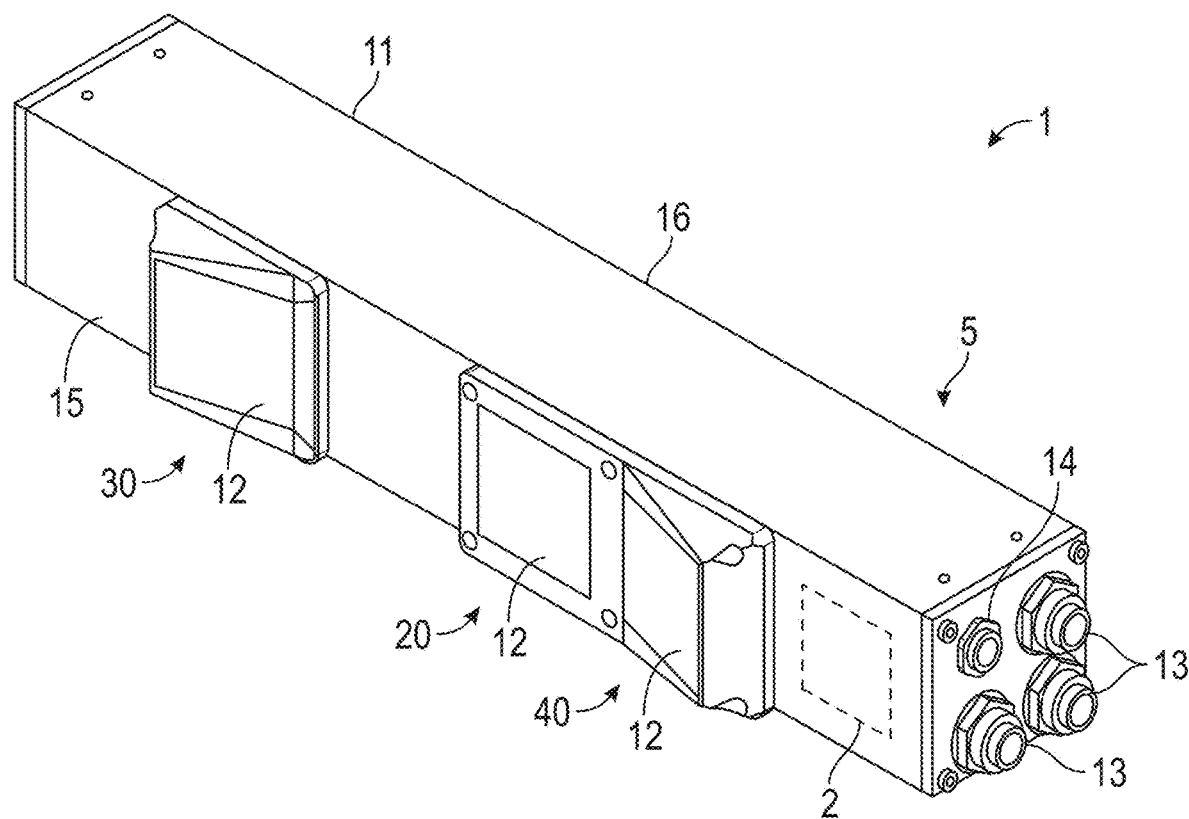
FIG. 4 is a perspective view of a 3D sensor, such as a triangulation scanner according to an embodiment.
Figure 5:
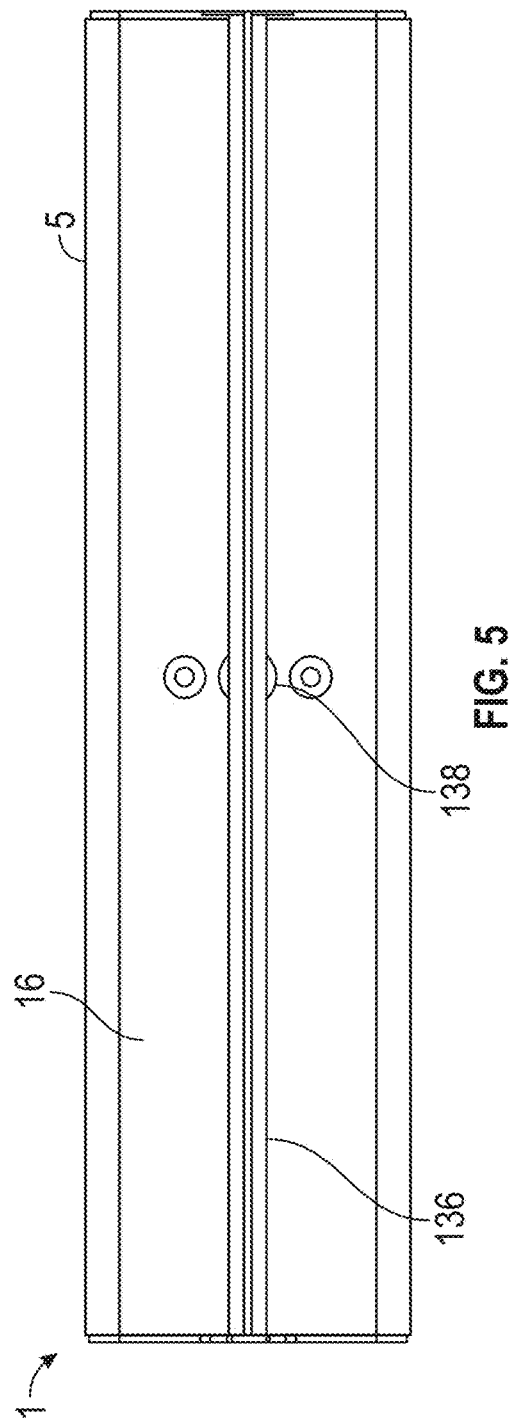
FIG. 5 is a partial rear view of the 3D sensor of FIG. 4.
Figure 6:
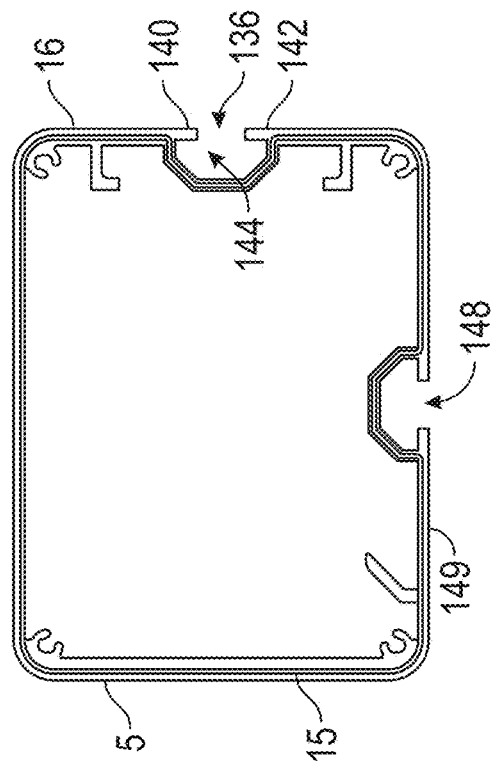
FIG. 6 is a partial sectional view of a housing for the 3D sensor of FIG. 4 according to an embodiment.
Figure 10:
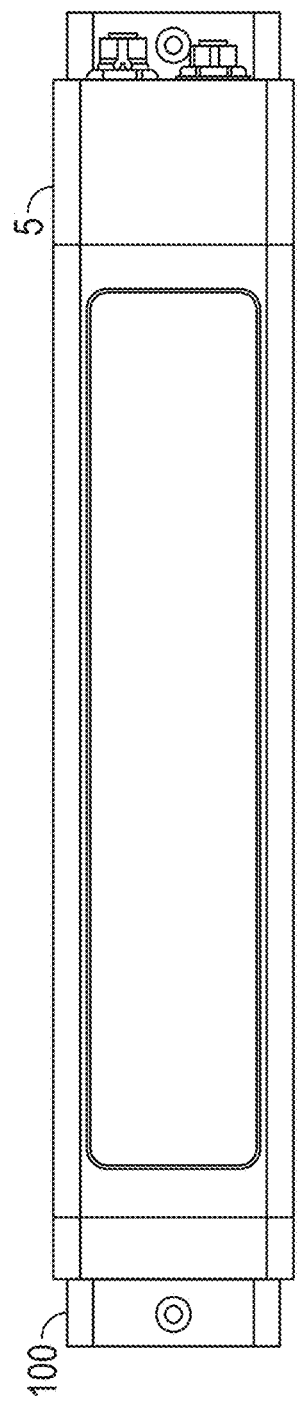
FIG. 10 is a second side view of the mounting bracket coupled to the 3D sensor.
Figure 11:
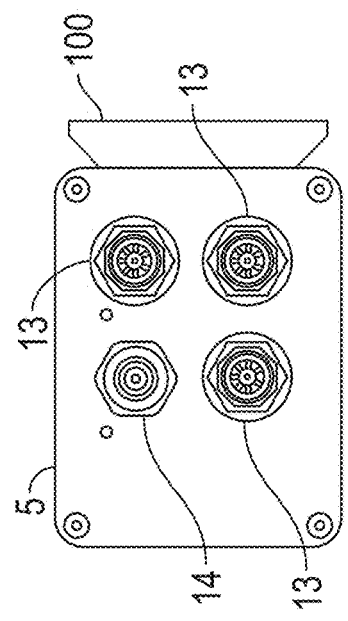
FIG. 11 is an end view of the mounting bracket coupled to the 3D sensor.
Figure 12:
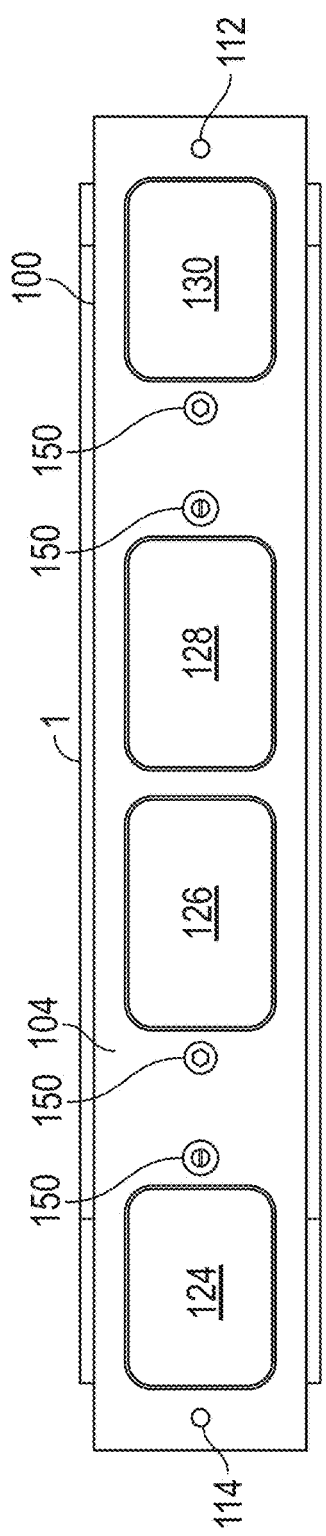
FIG. 12 is a side view of the mounting bracket coupled to the 3D sensor.

In an embodiment illustrated in FIG. 4, a 3D sensor, such as a triangulation scanner 1 includes a housing or body 5, a projector 20, a first camera 30, and a second camera 40. In an embodiment, the projector optical axis 22 of the projector 20, the first-camera optical axis 32 of the first camera 30, and the second-camera optical axis 42 of the second camera 40 all lie on a common plane. In some embodiments, an optical axis passes through a center of symmetry of an optical system, which might be a projector or a camera, for example. For example, an optical axis may pass through a center of curvature of lens surfaces or mirror surfaces in an optical system.

In an embodiment, the body 5 includes a bottom support structure, a top support structure, spacers, camera mounting plates, dress cover, windows 12 for the projector and cameras, Ethernet connectors 13, and GPIO connector 14. In addition, the body includes a front side 15 and a back side 16. In an embodiment, the bottom support structure and the top support structure are flat plates made of carbon-fiber composite material. In an embodiment, the carbon-fiber composite material has a low coefficient of thermal expansion (CTE). In an embodiment, the spacers are made of aluminum and are sized to provide a common separation between the bottom support structure and the top support structure.

In an embodiment, a processor 2 is used to determine 3D coordinates of points on an object. The processor 2 may be included inside the body 5 or may be external to the body. In further embodiments, more than one processor is used. In still further embodiments, the processor 2 may be remotely located from the triangulation scanner.

In an embodiment, the 3D sensor 1 is that described in commonly owned and co-pending U.S. patent application Ser. No. 15/784,437 filed on Oct. 17, 2017, the contents of which are incorporated by reference herein in its entirety.

Figure 1:
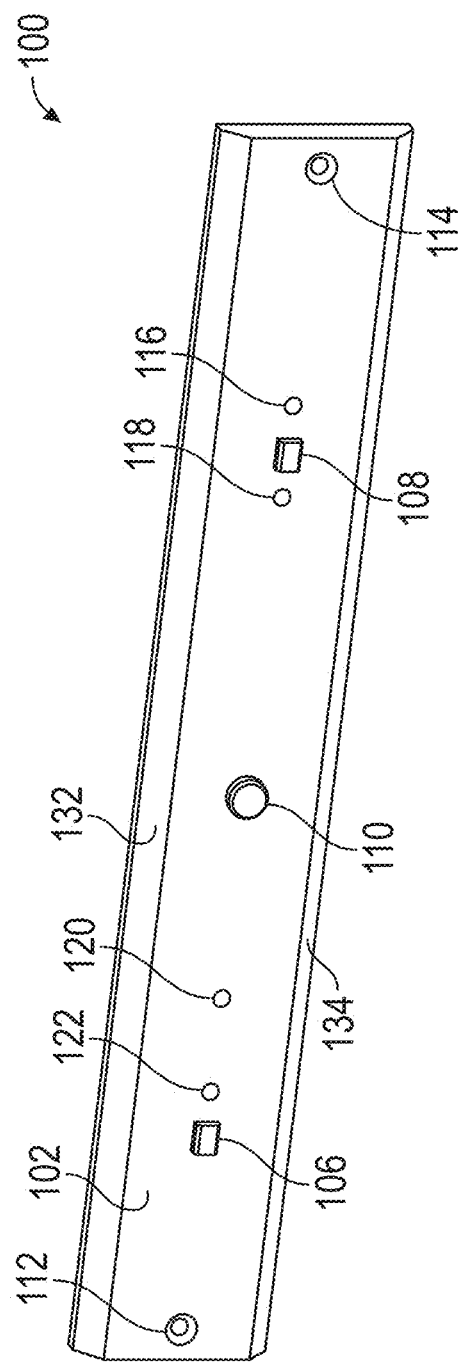
FIG. 1 is a perspective view of a 3D sensor mounting bracket in accordance with an embodiment.
Figure 2:
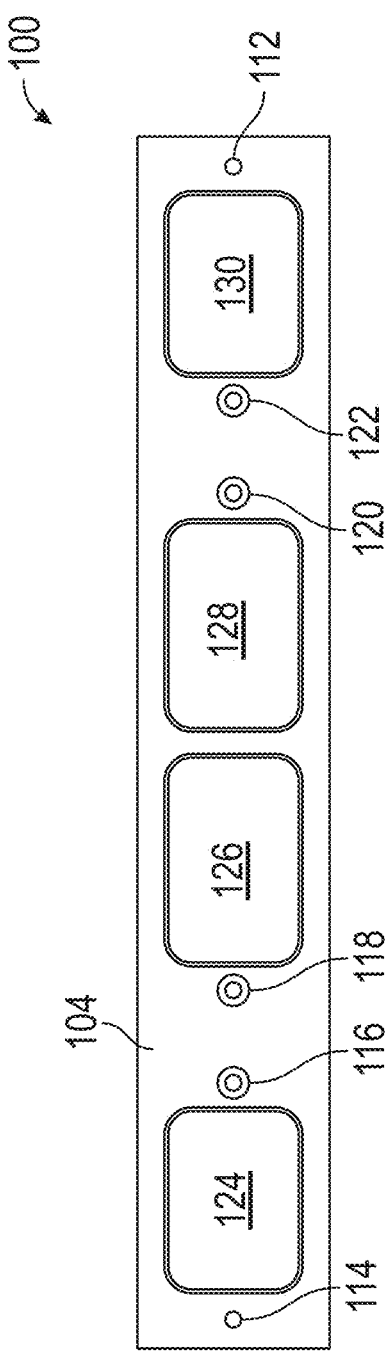
FIG. 2 is a side view of the mounting bracket of FIG. 1.
Figure 3:
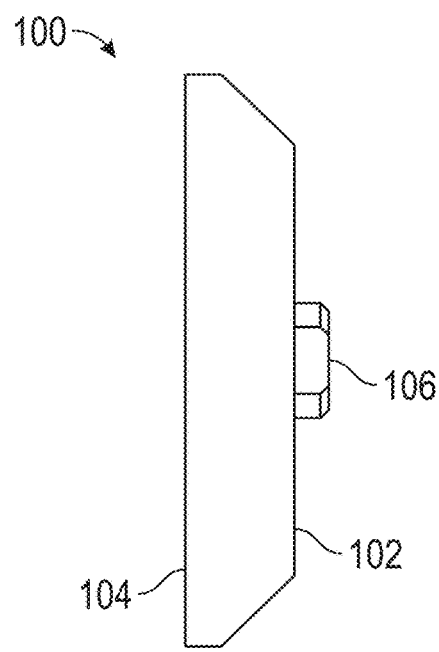
FIG. 3 is an end view of the mounting bracket of FIG. 1.

Referring now to FIG. 1, an embodiment of a mounting bracket 100 is shown. The bracket 100 is a generally elongated planar member having a front surface 102 and a rear surface 104. As will be discussed in more detail herein, the front side 102 is placed in contact with the backside 16 of the 3D sensor 1. The rear surface 104 engages and is in contact with the support structure or fixture that the 3D sensor 1 is mounted. Extending from the front surface 102 are a pair of keystone members 106, 108. In an embodiment, a dowel pin 110 extends from the front surface 102. In an embodiment, the dowel pin 110 is disposed half-way between the keystone members 106, 108. The front side of the bracket 100 may include chamfered surfaces 132, 134 that extend along the length of the bracket 100.

The mounting bracket 100 includes a pair of structure mounting holes 112, 114 that are arranged on opposing ends of the front surface 102. The holes 112, 114 extend through the thickness of the bracket 100. In the illustrated embodiment, the holes 112, 114 are countersunk on the front surface 102 side. The bracket 100 further includes a plurality of sensor mounting holes 116, 118, 120, 122 that extend through the thickness of the bracket 100. In the illustrated embodiment, the holes 116, 118, 120, 122 are countersunk on the rear surface 104 side. The rear surface further includes a plurality of recesses 124, 126, 128, 130.

In the illustrated embodiment, the back side 16 of the body 5 includes a slot 136 with a centrally disposed recess 138. The slot is sized to receive the keystone members 106, 108. In the illustrated embodiment, the recess 138 is sized and shaped to receive dowel pin 110. The slot 136 includes a pair of arms 140, 142 that define a channel 144. The channel 144 is sized and shaped to receive a slot nut 146 (FIG. 8). It should be appreciated that the slot nut 146 may be moved along the length of the slot 136 allowing the slot nut 146 to be positioned to receive a fastener via one of the holes 116, 118, 120, 122. In one embodiment, the arms 140, 142 have dimples or recesses at predefined position (e.g. 25 mm apart) on a surface opposite the front surface 102. The dimples allow the use of slot nuts with spring loaded spheres for example and facilitate positioning of the slot nuts. In the illustrated embodiment, the body 5 includes a second slot 148 positioned on a second surface 149 of the body 5. In an embodiment, the slot 148 is oriented 90 degrees relative to the slot 136.

In operation, the operator places one or more slot nuts 146 of a desired size into the slot 136. These nuts are aligned with one of the respective holes 116, 118, 120, 122. The front side 102 of the mounting bracket is then placed over the back side 16 and the keystone members 106, 108 are slid into the slot 136 and the dowel pin 110 into the recess 138. Fasteners 150 are placed in the desired holes 116, 118, 120, 122 and fastened to the respective slot nuts 146. As the fasteners are tightened, the slot nuts 146 will clamp the mounting bracket 100 to the body 5.

To mount the 3D sensor 1 to a fixture, the operator may place fasteners 158 (FIG. 7) in holes 112, 114 and fasten them to threaded holes in a respective mounting structure or fixture. It should be appreciated that the mounting bracket 100 may be longer than the body 5 to allow the fasteners to be placed in the holes 112, 114. In an embodiment, the mounting structure or fixture (not shown) may include slots sized to receive slot nuts 156. In this manner, the mounting bracket 100 may be coupled via the fasteners 150 to the mounting structure or fixture.

It should be appreciated that the mounting bracket 100 allows the 3D sensor 1 to be easily and repeatedly assembled in the same location due to the alignment of the keystone members 106, 108 and the dowel pin 110 in the slot 136 and recess 138.

In an embodiment, the 3D sensor is calibrated against the alignment elements such that the relative orientation transformation is known; using this relative orientation to position the data into the same coordinate system when replacing a 3D sensor with another. It should be appreciated that this allows a 3D sensor to be replaced by another 3D sensor while still the data is in the same coordinate system as before, no calibration measurement determining the position and pose of the new 3D sensor is required. To perform this, a calibration setup consisting of an alignment element that fits to the alignment elements of the 3D sensor and a reference object that can be localized in 6 degrees of freedom using the 3D sensor. This calibration setup defines the relative position and pose between the alignment elements and the reference object. The reference object defines a coordinate system. A compensation measurement of 2 sensors with the same calibration setup will result in transformation parameters that give the relation between the coordinate system of each sensor before compensation measurement and the common coordinate system of the reference object. This way the sensors can be mounted and one replacing the other while compensating the 3D data to be in the same coordinate system as with the other sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A 3D sensor system comprising:
a 3D sensor that measures 3D coordinates of a surface, the 3D sensor having a body with a first slot disposed in, and extending along a length of, a first side, the slot further having a first semi-circular recess centrally disposed along the length of the first side, the 3D sensor having at least one projector and at least one camera disposed within the body;
one or more slot nuts disposed in the slot;
a planar mounting bracket removably coupled to the 3D sensor, the mounting bracket having a pair of keystone members and a dowel pin disposed therebetween, the pair of keystone members and the dowel pin extending from a side of the mounting bracket, the keystone members being disposed in the first slot and the dowel pin being disposed in the first recess, the mounting bracket having a plurality of holes aligned with the first slot; and
one or more fasteners extending through the plurality holes and engaging the one or more slot nuts to couple the mounting bracket to the 3D sensor.

2. The sensor system of claim 1, wherein the 3D sensor includes a second slot disposed in a second side.

3. The sensor system of claim 2, wherein the second side is oriented 90 degrees to the first side.

4. The sensor system of claim 1, wherein the mounting bracket includes a plurality of recesses on a side opposite the 3D sensor.

5. The sensor system of claim 4, wherein the mounting bracket is an elongated planar member.

6. The sensor system of claim 5, wherein the dowel is disposed half-way between the pair of keystone members.

7. The sensor system of claim 6, wherein the mounting bracket further includes a pair of mounting holes positioned adjacent the ends of the mounting bracket, the pair of mounting holes extending therethrough.

8. The sensor system of claim 7, wherein the plurality of holes includes a plurality of sensor mounting holes that extend therethrough.

9. The sensor system of claim 8, wherein the plurality of sensor mounting holes includes a first pair of sensor mounting holes, a first of the pair of keystone members being disposed between the first pair of sensor mounting holes.

10. The sensor system of claim 9, wherein the plurality of sensor mounting holes includes a second pair of sensor mounting holes, a second of the pair of keystone members being disposed adjacent the second pair of sensor mounting holes.

11. The sensor system of claim 1, wherein the first slot is defined by a pair of arms that define a channel.

12. The sensor system of claim 11, wherein the slot nuts are movably disposed within the channel.

13. The sensor system of claim 12, wherein each of the pair of arms includes a plurality of dimples or recesses spaced apart a predetermined distance.

14. The sensor system of claim 13, wherein the slot nuts includes a spring loaded sphere that cooperates with the plurality of dimples or recesses to facilitate positioning of the slot nuts.

15. The sensor system of claim 14, wherein the predetermined distance is 25 millimeters.

16. The sensor system of claim 1, wherein the 3D sensor includes a third side, the third side having a plurality of Ethernet connectors thereon.

17. The sensor system of claim 16, wherein the 3D sensor includes a projector and at least one camera disposed on a fourth side opposite the first side.

\* \* \* \* \*